A. FULLERTON.
APPARATUS FOR DESICCATING EGGS.
APPLICATION FILED JUNE 3, 1908.
916,138.
Patented Mar. 23, 1909.
3 SHEETS—SHEET 1.
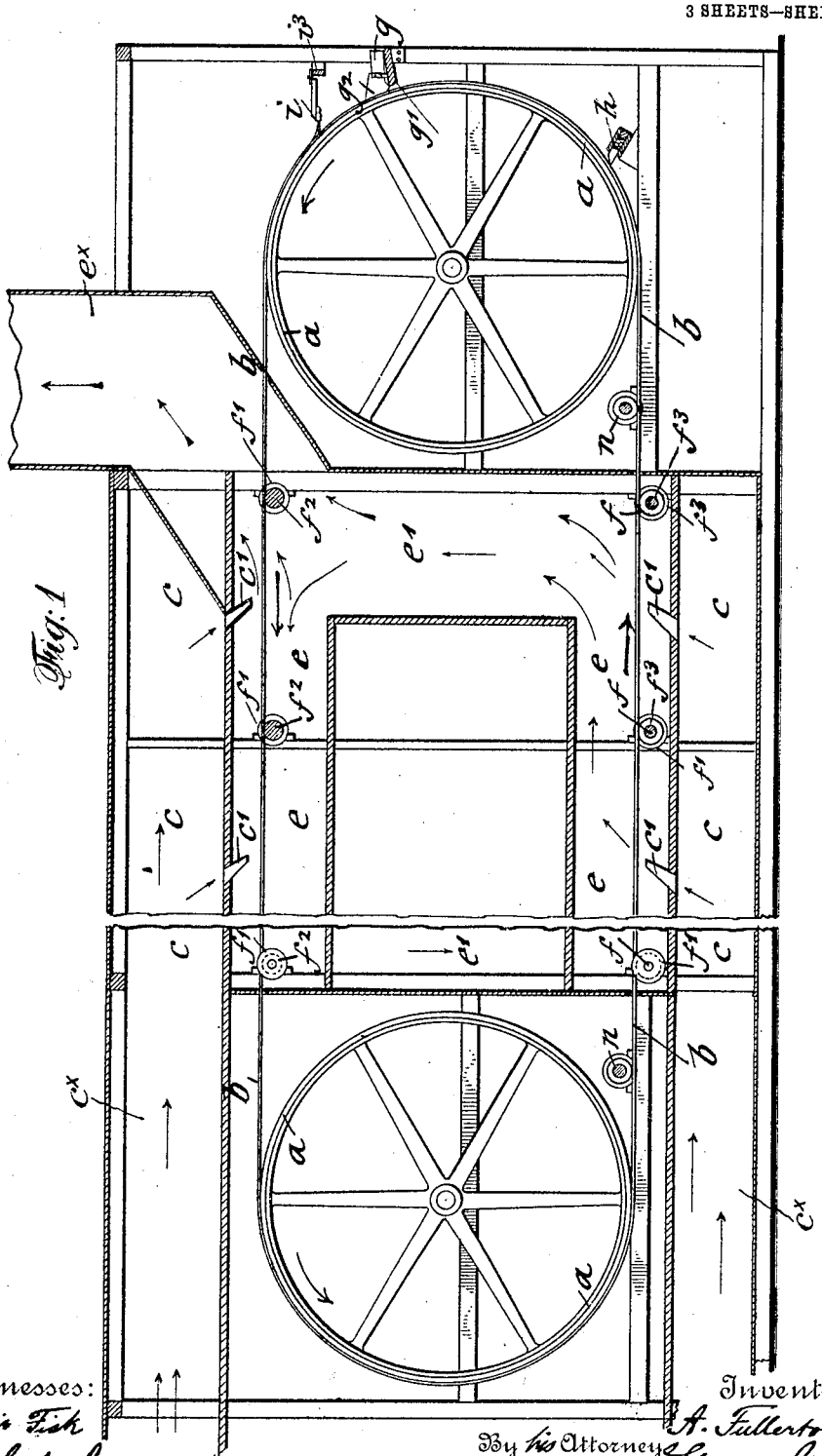

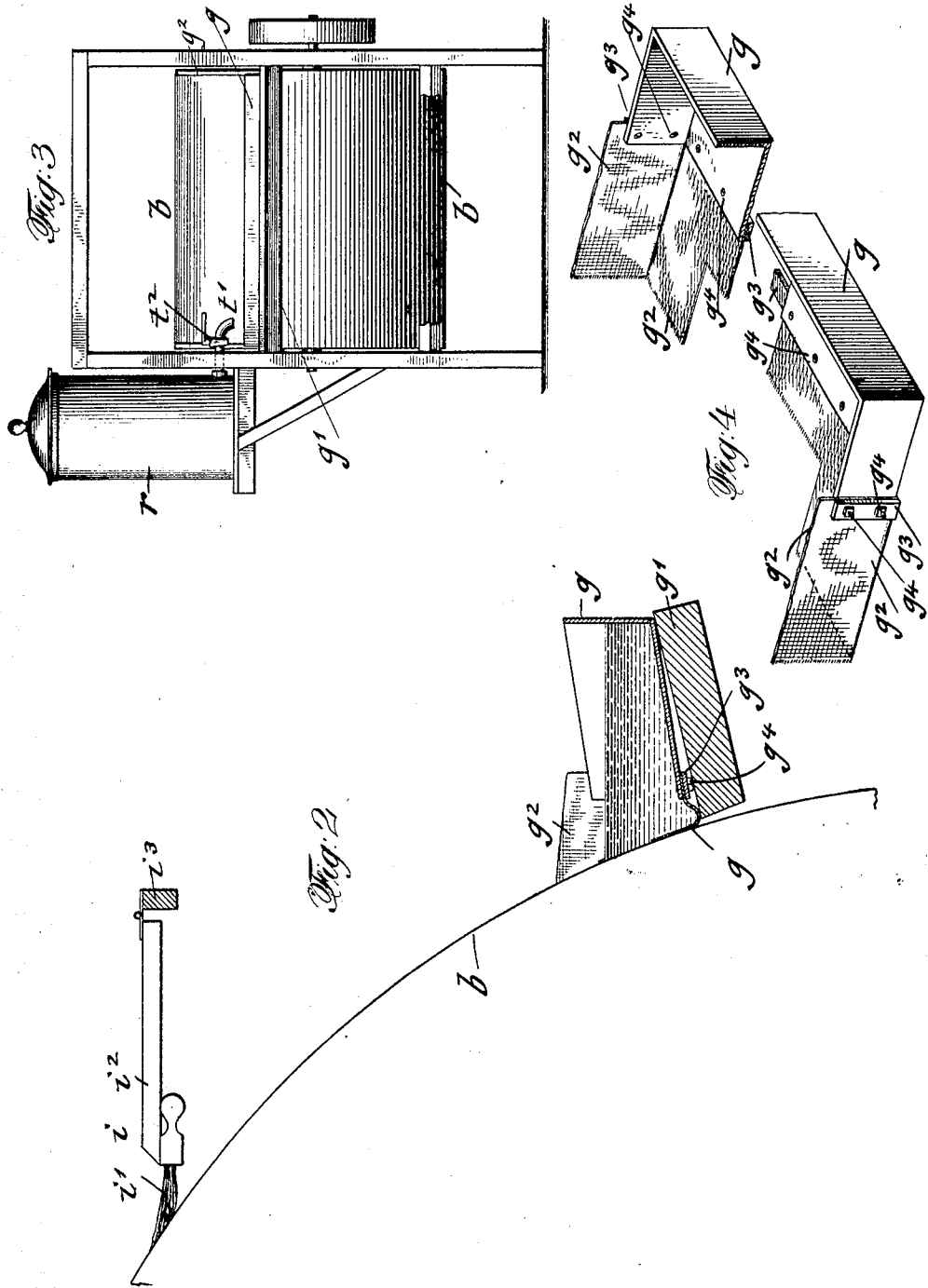

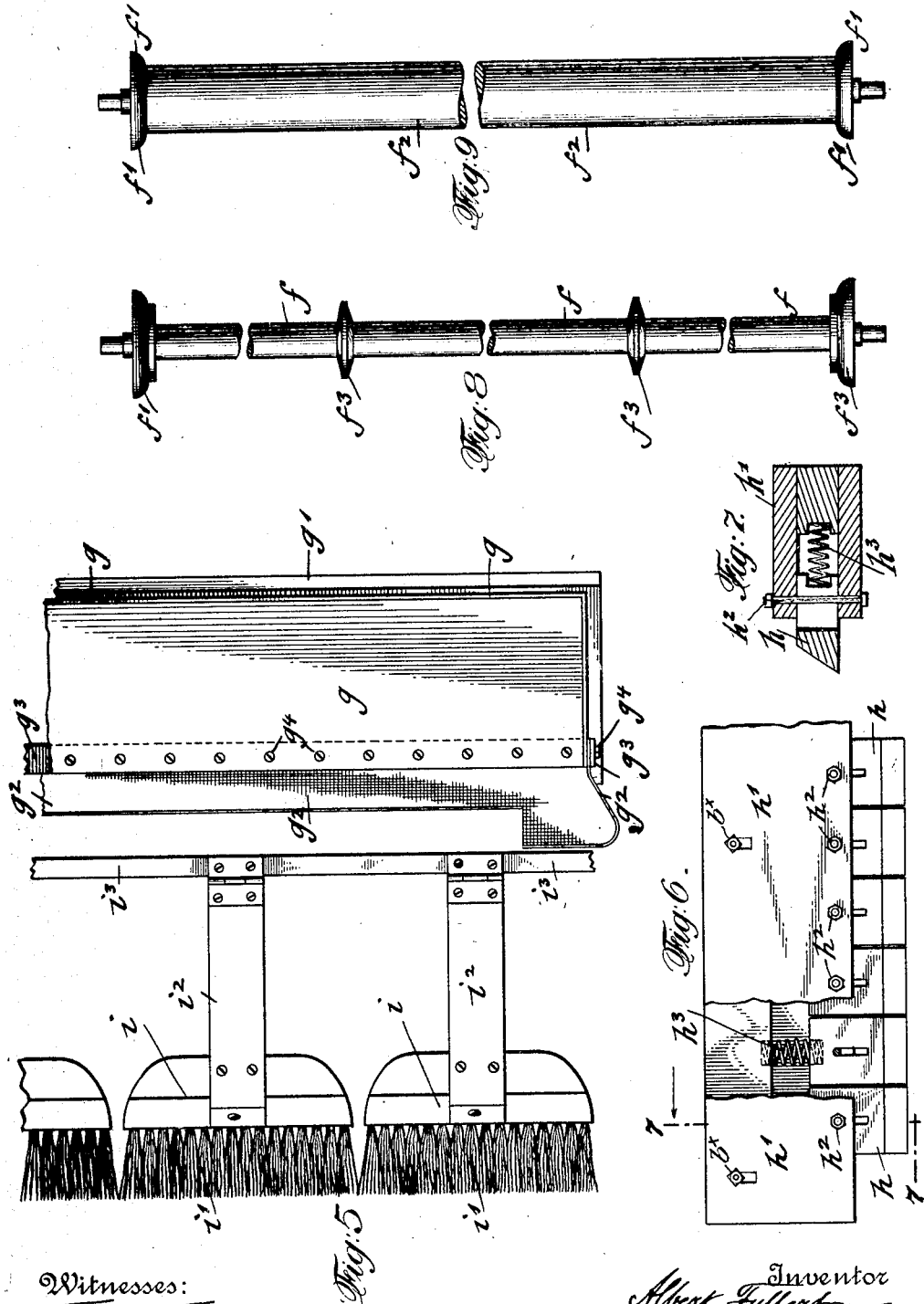

UNITED STATES PATENT OFFICE.

ALBERT FULLERTON, OF SIOUX CITY, IOWA, ASSIGNOR TO NATIONAL BAKERS' EGG CO., OF SIOUX CITY, IOWA, A CORPORATION OF MISSOURI.

APPARATUS FOR DESICCATING EGGS.

No. 916,138. Specification of Letters Patent. Patented March 23, 1909.

Application filed June 3, 1908. Serial No. 436,336.

*To all whom it may concern:*

Be it known that I, ALBERT FULLERTON, a citizen of the United States, residing at Sioux City, in the county of Woodbury and State of Iowa, have invented certain new and useful Improvements in Apparatus for Desiccating Eggs, of which the following is a specification.

This invention relates to an improved apparatus for desiccating eggs in an effective and continuous manner and obtaining the desiccated eggs in the form of light flakes ready for storage, shipment and immediate use by bakers, confectioners and others; and for this purpose the invention consists of an apparatus for desiccating eggs which comprises an endless carrier for the egg batter, wheels or drums, over which the carrier is stretched and to which motion is imparted, a feed trough, one side of which is open and provided with a canvas retaining-flap, a brush device for distributing the film of egg batter uniformly over the surface of the carrier, a scraper located below the feed-trough for removing the dry film of egg from the surface of the carrier or belt, rollers for supporting the upper and lower run of the carrier or belt intermediately between the drums, chambers provided with nozzles for supplying heated air to the surface of the belt, and suction air-ducts or chambers for removing the moisture evaporated from the film of egg and conducting the same to the outside of the apparatus as will appear from the following description and claims.

In the accompanying drawings, Figure 1 represents a vertical longitudinal section of my improved apparatus for desiccating eggs, Fig. 2 is an enlarged portion of the carrier or belt, showing the position of the egg-feeding trough and brush-spreader, drawn on a larger scale; Fig. 3 is an end-elevation of the feed-trough showing its relation with the egg batter supply-tank, Fig. 4 is a perspective view of the feed-trough shown as removed from the carrier or belt and showing the yielding retainer at the bottom and ends of the same; Fig. 5 is a plan view of the brush-spreader and feed-trough; Figs. 6 and 7 are respectively a plan-view and a vertical transverse section on line 7, 7, Fig. 6, of the scraper for removing the dried egg from the carrier-belt, Fig. 8 is a detail side-view of one of the roller shafts, showing the roller carriers for the body and edges of the belt, and Fig. 9 is a guide-roller for guiding the belt on the uncovered side of the same.

Similar letters of reference indicate corresponding parts throughout the several figures.

The improved apparatus for desiccating eggs consists of the following main parts:

An endless carrier or belt, drums for supporting the same, a feed-trough located about midway of the starting end of the apparatus, a spreader for the film of egg located above the feed-trough, a scraper located at the return-portion of the belt below the feed-trough, roller-carriers for supporting and guiding the belt, air-ducts for supplying the heated air provided with nozzles for throwing the heated air at regular intervals on the belt, and a suction air-duct through which the moisture laden air is conducted away from the apparatus.

The carrier-belt $b$ is made of metal, preferably zinc, and is guided over two wheels or drums $a$, the shafts of which are supported in bearings on the framework of the apparatus, one of the drums receiving motion from a suitable motor, so as to impart intermittent or continuous motion to the endless carrier-belt $b$. The belt is made of sufficient length so as to produce the drying of a film of egg batter by one passage of the same below the air-ducts $c$ from which the air is supplied by means of inclined nozzles $c^1$ so as to deliver the heated air at regular intervals in jets on to the moving belt and supply thereby fresh, heated air over the entire length of the same. The air-chambers $c$ are arranged at the top and bottom of the apparatus and supplied with pure filtered air heated by steam-coils or other means so as to raise the temperature of the air to the proper degree. The heated air is led into the air-chambers $c$ by means of horizontal ducts $c^x$ communicating with air-chambers at one end, as shown in Fig. 1. The carrier-belt passes through a suction-chamber or duct $e$, which is located at the upper part below the hot-air chamber $c$, and at the lower part of the apparatus above the air-chamber $c$, as shown in Fig. 1. The secondary or suction air-duct $e$ is connected with a suitable ventilating fan (not shown) so as to cause a suction-draft through the air-duct or chamber $e$ and through the upright portions $e^1$ of the same adjacent to the drums $a$. The metallic belt is guided at the edges by means of hardwood rollers $f$, which are provided with shoulders $f^1$, and across the entire width of the upper run by solid rollers $f^2$ while the lower run is supported on disks $f^3$ having narrow faces so that only a small portion of the lower run of the belt rests on the same. The upper solid rollers $f^2$ and the lower disks $f^3$ support the belt in uniform manner in its upper and lower runs while passing through the air-chambers $e$ and prevent the sagging or buckling of the belt. The belt is supported in horizontal position throughout and may be made of any length, preferably, however, of such a length that one complete rotation of the belt is capable of drying one film of egg batter supplied to the same from the feed-trough.

By arranging two systems of air-chambers or ducts $c$, superimposed over each other, a supply and a suction-chamber for the upper and lower runs of the belt, a continuous supply of fresh air can be thrown on the film-covered surface of the belt throughout its entire length and the evaporated moisture drawn off continuously therefrom. The heated air is emitted through the nozzles of the air-ducts with considerable force so as to facilitate and accelerate thereby the process of drying the film.

The feed-trough $g$ is supported at one end of the apparatus on an inclined shelf $g^1$, which is supported on the uprights of the apparatus and is made of sheet-metal, preferably zinc. The trough is provided with an inclined bottom, which rests on the shelf, and with upright endwalls, but is open at the side adjacent to the belt. To the forward ends of the bottom and endwalls of the feed-trough is attached by exterior strips $g^3$ and bolts $g^4$ a canvas-retainer $g^2$, which is made slightly higher than the endwalls and which projects beyond the edge of the sheet-metal bottom, forming a continuation of same, the feed-trough being placed in such a manner relatively to the belt, when in position, that the rapid upward movement of the belt upon the drum causes the moist canvas-retainer, to lie flat upon and cling closely to the metallic surface of the belt, forming a water-tight joint, while the end-walls of the retainer, when in position, prevent the egg batter from leaking or running over at the sides.

The bottom portion of the retainer is recessed at its middle portion, as shown in Fig. 4, so as to allow the egg batter as it rises in the trough, to flow directly onto the belt, while the end-portions or end flaps of the retainer are extended higher up on the belt and lying against the latter keep the egg batter from getting onto the belt at the extreme edges of same, so that the width of the recessed portion of the canvas-retainer governs the width of the egg film upon the belt. The egg batter, which is formed of a properly stirred mixture of eggs, is placed in a receiver $r$, which is provided with a discharge-spout $t^1$ having a stopcock $t^2$, as shown in Fig. 3.

The receiver $r$ is supported on a bracket on the framework of the apparatus and filled either from time to time or supplied continuously from a larger receptacle, according as the belt is to make intermittent or continuous runs. The liquid egg in the feed-trough presses against the canvas face or flap of the retainer, so that the edge of the same forms close contact with the belt and prevents thereby the escape of any of the liquid egg in a downward direction. As the level of the liquid egg in the trough is considerably higher than the inner edge of the canvas flap of the retainer, the liquid egg rises above the edge of the same and flows directly onto the belt-surface, (except at the extreme sides where the flap rises above the egg surface) by which it is carried upward in a thick film or coating until it arrives at a spreading device $i$, which is placed above the feed-trough at some distance from the same.

The spreading device $i$ is made of a number of brushes $i^1$ which are arranged in line across the belt. Each brush is provided with a shank $i^2$ which is hinged to a transverse strip $i^3$ that is attached to the supporting uprights of the apparatus. The hinge-connection of the shank $i^2$ with the transverse strip $i^3$ permits each brush to move independently of the adjacent brushes and yield thereby freely to any inequalities in the belt. The brushes serve to spread the egg in a very thin film over the belt so as to produce thereby the rapid drying of the same. The weight of the brushes used determines the thickness of the film which the belt will take up at each rotation, so that in this manner each successive film or coat can be regulated to the thickness desired. In place of using lighter or heavier brushes, the same effect can be obtained by placing pieces of metal or other heavy material of different weights across the spreading brushes.

The scraper $h$ is arranged at some distance below the feed-trough in contact with the return-run of the belt. It is constructed of a number of spring-actuated beveled sections, which are guided independently of each other between the supporting plates $h^1$ by means of slots at the center of the same and upright guide-pins $h^2$. Helical springs $h^3$ are interposed between the rear-block held between the plates $h^1$ and the rear-ends of the scrapers, the ends of said helical springs being set securely in recesses in the faces of the block and in the rear-portions of the beveled scraper-sections. The individual springs serve for cushioning the scrapers, and impart thereby an individual motion to the same so that they hug the belt with their sharp edges, but yield readily as required for overcoming any inequalities in the belt. The dried film of egg is removed from the belt and dropped into a suitable receptacle (not shown) arranged below the scraper.

Operation: A sufficient quantity of egg batter is prepared in the well known manner and supplied from the receiver to the feed-trough by opening the discharge-spout of the receiver. When the feed-trough is filled, the stopcock of the supply-spout is adjusted in such a manner that a reduced but continuous supply is kept up to the feed-trough for forming a continuous film on the belt. This film which is thus transferred from the feed-trough to the surface of the belt is quite thick and heavy. As the belt passes below the spreading brushes, the surplus of the egg drops back into the trough while a thin uniform layer is conducted through the brushes and distributed over the surface of the belt and then conducted through the hot air-ducts past the nozzles for the heated air, so that the moisture from the film of egg is gradually evaporated and the latter dried by the heated air supplied through the nozzles onto the egg-covered surface of the belt. The air which is laden with moisture evaporated from the film of egg, is conducted off through the suction air-ducts. As the belt returns over the drum at the opposite end of the apparatus, it is taken up by the carrier-disks, arranged in the lower suction air-duct and acted upon by the heated air delivered by the supply-nozzles arranged in the lower air-duct of the apparatus until the belt leaves the chamber $e$, where it passes under a guide-roller $n$ back to the drum at the ingoing end and to the scrapers located below the feed-trough. As the film on the lower run of the belt is of a certain degree of dryness and hardness no tracks or traces are formed on the surface of the film by contact with the carrier-disks $f^3$. The scraper $h$ is so arranged that it can be adjusted toward or away from the belt according as one film or a plurality of superimposed films is desired to be placed on the belt. This adjustment can be effected by the belt and slot connection $b^\times$ shown in Fig. 6, or any suitable construction. When the belt is of sufficient length so as to dry one film of egg by one rotation of the same, the egg is removed by the scraper at each run, but in case continuous working of the apparatus is desired, then a plurality of films is superimposed on the belt, one above the other, and then scraped off together by placing the scrapers in position against the belt. The dried egg is peeled off in the form of flakes and packed in a suitable manner for shipment and use.

Having thus described my invention I claim as new and desire to secure by Letters Patent:

1. In apparatus for desiccating eggs, the combination of a horizontally-disposed endless drying belt, means for supplying the egg-batter thereto, hot-air chambers located respectively above and below the upper and lower runs of said belt, nozzles arranged in series located longitudinally of the belt to impinge the air from said chambers against the outer surface of the belt, and a suction-chamber located between said runs of the belt within the latter and which receives the moistened air after its action on the egg-film.

2. In apparatus for desiccating eggs, the combination of a horizontally-disposed endless drying belt, hot-air chambers located respectively above and below the upper and lower runs of said belt and having in their walls nozzles to direct the drying air against the egg-film on the belt, and a suction-chamber between the runs of the belt and in communication by means of said nozzles with both of said hot-air chambers, said suction-chamber having portions extending adjacent the inner surface of the belt opposite the nozzles and an upright portion extending from one run of the belt to the other and connecting said first-named portions.

3. In an apparatus for desiccating eggs, the combination, with an endless belt, of a feed-trough open at one side and having said side adjacent the belt, a retainer formed of a flat sheet of flexible fabric applied to the bottom of said trough at the edge adjacent said open portion, the main portion of said retainer lying upon and clinging to the belt, and end-flaps on said retainer which lie flat on the belt and extend above the level of the batter in the trough.

4. In an apparatus for desiccating eggs, the combination, with an endless belt, of a feed-trough open at one side and having said side adjacent the belt, a retainer formed of a flat sheet of flexible fabric applied to the bottom of said trough at the edge adjacent said open portion, said retainer lying upon and clinging to the belt, end-flaps on said retainer which lie flat on the belt and extend above the level of the batter in the trough, and upright end-walls formed at the ends of said end-flaps and extending upward at the sides of the belt, said end-walls being connected with the end-walls of the trough.

5. An apparatus for desiccating eggs, comprising a traveling belt, a feed-trough in operative relation thereto, and film-spreading brushes located above the feed-trough, said brushes being hinged independently of each other, for passing freely over the inequalities of the belt.

6. An apparatus for desiccating eggs, comprising an endless traveling belt, a feed-trough in operative relation thereto, spreading brushes above said feed-trough, and a scraper below said feed-trough, said scraper being composed of individual spring-cushioned sections.

In testimony, that I claim the foregoing as my invention, I have signed my name in presence of two subscribing witnesses.

ALBERT FULLERTON.

Witnesses:
PAUL GOEPEL,
HENRY J. SUHRBIER.